US006441774B1

(12) United States Patent
Pond

(10) Patent No.: US 6,441,774 B1
(45) Date of Patent: Aug. 27, 2002

(54) HELIOGRAPHIC INK JET APPARATUS AND IMAGING PROCESSES THEREOF

(75) Inventor: Stephen F. Pond, Oakton, VA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,155

(22) Filed: Nov. 29, 1999

(51) Int. Cl.[7] ........................................ G01D 11/00
(52) U.S. Cl. .................... 342/100; 347/101; 347/99
(58) Field of Search ........................ 347/100, 101, 347/99

(56) References Cited

U.S. PATENT DOCUMENTS

| | | | | |
|---|---|---|---|---|
| 4,413,266 A | | 11/1983 | Aviram et al. | 346/21 |
| 4,630,076 A | | 12/1986 | Yoshimura | 346/140 |
| 4,680,058 A | | 7/1987 | Shimizu et al. | 106/23 |
| 4,680,645 A | | 7/1987 | Dispoto et al. | 358/298 |
| 4,880,465 A | | 11/1989 | Loria et al. | 106/20 |
| 5,543,177 A | | 8/1996 | Morrison et al. | 427/288 |
| 5,552,811 A | | 9/1996 | Kurata et al. | 347/28 |
| 5,607,999 A | | 3/1997 | Shimizu et al. | 524/503 |
| 5,674,923 A | | 10/1997 | Subbaraman et al. | 523/160 |
| 5,710,195 A | | 1/1998 | Subbaraman et al. | 524/31 |
| 5,833,743 A | | 11/1998 | Elwakil | 106/31.27 |
| 5,922,115 A | | 7/1999 | Sano et al. | 106/31.32 |
| 6,086,197 A | * | 7/2000 | Kubota et al. | 347/100 |

* cited by examiner

*Primary Examiner*—John Barlow
*Assistant Examiner*—Manish S Shah
(74) *Attorney, Agent, or Firm*—Robert Thompson

(57) ABSTRACT

A process including: jetting at least one ink from a color ink set onto a substrate to form a first pixel; and jetting a heliosing ink onto the first pixel to form a heliosed pixel, wherein the first pixel is substantially free of resolution diminution in the heliosed pixel. The process can also be accomplished in the reverse jetting order, that is, jetting a heliosing ink onto a substrate to form a patent or latent heliosed first pixel; and jetting at least one ink from a color ink set over the heliosed first pixel to form a heliosed color pixel, wherein the resolution in the heliosed pixel is substantially the same as the resolution in the absence of the heliosing ink. The heliosing ink formulations can include, for example, one or more of: an obscurant, a bleachant, or a penetrant. The processes of the present invention can be used to create heliographic images.

18 Claims, 4 Drawing Sheets

HELIOGRAPHIC INK JET APPARATUS AND IMAGING PROCESSES THEREOF

REFERENCE TO COPENDING APPLICATIONS AND ISSUED PATENTS

Attention is directed to commonly owned and assigned copending Application Numbers:

U.S. Ser. No. 09/178,147, filed Oct. 23, 1998, entitled "COLOR LIQUID DEVELOPERS AND PROCESSES THEREOF," which discloses a process comprising developing a set of colored liquid toners to form spot color images, wherein the color gamut of all the images encompasses substantially the entire PANTONE® color space, wherein the set of colored liquid toners comprises 13 inks consisting of: a yellow ink; an orange ink; two non equivalent red inks; a magenta ink; a purple ink; a violet ink; two non equivalent blue inks; a cyan ink; a green ink; a black ink; and including a white or colorless ink, that is pigment free ink;

U.S. Ser. No. 09/216,774, filed Dec. 21, 1998, entitled "INK COMPOSITIONS AND IMAGING PROCESSES THEREOF," discloses a process comprising: treating an ink jet receiver substrate with a non-ionic surfactant;

U.S. Ser. No. 09/450,154, filed concurrently herewith, entitled "INK JET APPARATUS AND IMAGING PROCESSES THEREOF," discloses, for example, a process comprising: jetting at least one ink from a color ink set onto a substrate to form a first pixel; and jetting a heliosing obscurant ink formulation onto the first pixel to form a heliosed pixel.

U.S. Ser. No. 09/450,153, filed concurrently herewith, entitled "INK JET APPARATUS AND IMAGING PROCESSES THEREOF," discloses, for example, a process comprising: jetting at least one ink from a color ink set onto a substrate to form a first pixel; and jetting a heliosing bleachant ink formulation onto the first pixel to form a heliosed pixel; and The disclosure of the above mentioned copending applications are incorporated herein by reference in their entirety. The appropriate components and processes of those patent applications may be selected for the inks and processes of the present invention in embodiments thereof.

BACKGROUND OF THE INVENTION

The present invention is generally directed to an ink jet printing apparatus and imaging processes thereof. More specifically, the present invention is directed to color thermal ink jet printers and printing processes which enable, for example, gray scale color imaging with minimal additional cost and or reconfiguration of, for example, conventional four color or process color thermal ink jet imaging processes and printing apparatus. Even more specifically, the present invention is directed to thermal ink jet imaging processes which provide, for example, ink jet imaging processes that include selectively accomplishing a first jetting of one or more inks from, for example, a four color ink jet set, such as cyan, magenta, yellow, and black (C, M, Y, B), to from a first pixel, and thereafter accomplishing a second jetting over a portion of the resulting first pixel with "heliosing" ink formulation to produce a "heliosed" pixel which heliosed pixel exhibits a whitened, lightened, or brightened appearance to an observer. The heliosing ink formulation can be, for example, an obscurant formulation, a bleachant formulation, a penetrant formulation, and compatible mixtures or combinations thereof. The process can be accomplished in the alternative reverse order to achieve comparable heliosed pixel effects. The processes of the present invention can be further accomplished, for example, either selectively or comprehensively, over a large array of pixels to produce, in the aggregate, heliographic images with value added image properties as disclosed and illustrated herein.

PRIOR ART

In U.S. Pat. No. 4,680,645 issued Jul. 14, 1987, to Dispoto, et al., there is disclosed the capability of varying sizes of a dot in a printer to provide a gray scale image of superior quality. Errors in gray level are used to modulate the sizes of the dots in producing the image.

In U.S. Pat. No. 4,630,076, issued Dec. 16, 1986 to Yoshimura, there is disclosed a color ink jet system printer of the ink-on-demand type which includes four orifices for emitting yellow ink droplets, magenta ink droplets, cyan ink droplets and black ink droplets, and an additional orifice for emitting white or transparent ink droplets. The white or transparent ink droplets are emitted in the thinned printing mode in a manner that the white or transparent ink droplets overlap on printed dots printed by the yellow, magenta, cyan and/or black ink droplets. By overlapping the white or transparent ink droplets on the previously printed dots, the previously printed dots bleed and spread to provide a light tone image superpixel.

In U.S. Pat. No. 5,552,811, issued Sep. 3, 1996, to Kurata, et al., there is disclosed a cleaning member for use in ink jet printing including a rinsing liquid that is discharged from a nozzle onto the cleaning member to wipe the discharging port surface of the liquid discharging apparatus. There is also disclosed the possibility of a liquid discharging head which discharges a bleaching agent to decolor ink, for example, in addition to the liquid discharging head to discharge ink to a printing medium. This is used to locally bleach the part which is deeply dyed by ink.

In U.S. Pat. No. 4,413,266, issued Nov. 1, 1983, to Aviram, et al., there is disclosed an apparatus for ink jet printing under the control of electronic circuitry and ink jet printing under the control of an operator, for example, a typewriter. Broadly, the technology presented in accordance with the principles of this invention utilizes an ink eradicator which removes indicia of the ink by chemical reaction. The character of the eradicator fluid is such that another fluid may be utilized either together therewith or separately to neutralize the residue from the chemical reaction so that printing can readily be accomplished in the location where erasure has occurred. Specifically, practice of this invention is contemplated with means that applies the eradicator fluid over the location on a surface where printing has occurred by ink jet droplets as well as over an entire area thereon within which there is ink jet printing for which a change is to be achieved. For exemplary embodiments of this invention, the eradicator fluid is applied by a wick from a reservoir and the chemical reaction is enhanced by heating the location for the erasure by an external heating means.

In U.S. Pat. No. 5,922,115, issued Jul. 13, 1999, to Sano et al., there is disclosed a decolorizable ink consisting of an ink dispersed in a solvent, the ink composition comprising a color former, a developer and a decolorizer, wherein the color former and developer are in a colored state by interaction between them and the decolorizer has a property to dissolve preferentially the developer when the ink composition is melted.

In U.S. Pat. No. 5,710,195 issued Jan. 20, 1998, to Subbaraman, et al., there is disclosed methods for creating opaque indicia on substrate surfaces and to non-pigmented, moisture-free, jet ink compositions containing only solvents and solvent soluble resins and dyes that exhibit the acceptable characteristics of opacity, contrast, adhesion and machine compatibility. The compositions contain a combination of film forming resins of varying molecular weights of a dry resin solids percentage between 8 and 15%. The resins are chosen from the following: nitrates of cellulose; acrylics; alkyds; vinyl acetate-vinyl chloride copolymers; and styrene acrylic. The quantities of resin are chosen according to the desired viscosity, adhesion strength of film on the subject substrate and the degree of shearing of the drying resin mixture. An optimum balance of adhesion and opacity is stoichiometrically obtained. The differential solubilities of the resins in the solvent-blend is the prime moving factor of the opacifying action. The use of acid dyes and basic salts that exhibit fluorescence is considered and used in the formulations to enhance the visibility and contrast of the resultant opacified dried state of resin solids on the substrate surface. The use of specific plasticizers are another feature of this invention. Plasticizers are used in the ink jet composition to increase the flowability of the composition and also increase the tensile strength and adhesion of the ink to the substrate to which it is applied. The principle of this invention is that a water-free, multi-solvent and multi-resin jet ink which characteristically forms micro laminate miscelli and plasticizers is found to have good adhesion and opacity, and can be used to mark code and indicate non-absorbent dark substrates.

In U.S. Pat. No. 5,674,923, issued Oct. 7, 1997, to Subbaraman, et al., there is disclosed non-pigmented opaque jet ink compositions and methods of creating opaque indicia with temporarily varying opacity which method includes applying the ink composition to a substrate; drying the ink composition to create an indelible, abrasion resistant, climatically stable and opaque indicia on the substrate; wetting the indicia with polar aqueous liquid to decrease the opacity of the indicia; and drying the indicia to increase the opacity of the indicia.

In U.S. Pat. No. 5,607,999, issued Mar. 4, 1997, to Shimizu, et al., there is disclosed water-based recording inks, including white inks, comprising water, a pigment, a water-soluble homopolymer and a copolymer having both a hydrophobic portion and a hydrophilic portion. The inks can provide a print having excellent density, light fastness and water resistance. Furthermore, the water-based recording ink has such various properties necessary for use as an ink jet recording ink that it does not clog a fine ejection nozzle, has excellent rubbing resistance and setting to dry in the print, is free from aggregation or settlement of solid matter, such as a pigment particle, and exhibits no change in the properties of the ink even when stored at a high temperature or a low temperature for a long period of time and can be redispersed by stirring or further addition of a solvent even when the pigment once aggregated.

In U.S. Pat. No. 5,543,177, to Morrison et al., issued Aug. 6, 1996, there is disclosed marking materials containing retroreflective fillers, for example, glass beads in white inks, and processes for the use thereof. In one embodiment, images containing retroreflective fillers are generated on paper by any suitable means, such as electrostatic imaging and development with either dry or liquid developers, ink jet printing, strip-out development processes, or the like, and the images thus generated are used to control a document reproduction system.

In U.S. Pat. No. 4,880,465, issued Nov. 14, 1989, to Loria, et al., there is disclosed non-pigmented inks suitable for use in ink jet printing comprising a resin component, hollow or non-hollow microspheres, and a suitable carrier vehicle. The hollow microspheres contain a central void region filled with a liquid capable of diffusing through the walls of the microspheres and have an inside diameter from about 0.1 to about 0.5 micron and an outside diameter from about 0.4 to about 1 micron.

In U.S. Pat. No. 4,680,058, to Shimizu et al., issued Jul. 14, 1987, there is disclosed a method where dark or black print articles are ink-jet printed with a white ink composition comprising at least a white pigment having a particle size of less than 3 micrometer, a solvent and a binder resin, resulting in good print stability. The white ink composition has a good dispersion stability, a good redispersability, and no nozzle clogging. White pigments include titanium oxide, zinc white, lithopon, lead white, zinc sulfide, white basic lead sulfate, zirconium oxide, antimony white, and tin oxide, which can be used alone or in their mixture.

In U.S. Pat. No. 5,833,743, issued Nov. 10, 1998, to Elwakil, there is disclosed a method of printing an image on a substrate with an ink jet printer, the method including the step of ejecting a plurality of discrete portions of ink from the ink jet printer toward the substrate, the ink including at least three different inks with each ink of each different pair of inks containing either different dyes or different concentrations of the same dye, and the step of sequentially forming a plurality of layers of ink dots on the substrate using the discrete portions of ink, with adjacent layers having overlapping ink dots formed of different inks, the plurality of layers of ink dots constituting the image, and the image fully covering all portions of the substrate beneath the image.

The aforementioned and hereinafter cited patents are incorporated by reference herein in their entirety.

There remains a need for aqueous ink compositions and thermal ink jet and related ink printing processes which can provide gray scale color printing and high resolution color images at low total cost for imaging materials and imaging hardware. These and other needs are provided for in embodiments of the present invention.

The ink compositions and processes of the present invention are useful in many applications including imaging and printing processes, including color printing, for example, thermal ink jet (TIJ), bubble jet, ballistic, and acoustic ink printing systems, including digital systems.

SUMMARY OF THE INVENTION

Embodiments of the present invention, include:

A process comprising:

- jetting at least one ink from a color ink set onto a substrate to form a first pixel; and
- jetting a heliosing ink onto the first pixel to form a heliosed pixel, wherein the first pixel is substantially free of resolution diminution in the heliosed pixel;

A process comprising:

- jetting a heliosing ink onto a substrate to form a first pixel; and
- jetting at least one ink from a color ink set onto the first pixel to form a heliosed pixel, wherein the resolution in the heliosed pixel is substantially the same as the resolution in the absence of the heliosing ink; and An ink jet recording apparatus with an ink jet deposition system which jets inks in accordance with the above heliographic processes to afford heliographic images.

These and other features are illustrated herein.

DETAILED DESCRIPTION OF THE INVENTION

The present invention provides, in embodiments, a process comprising:

jetting at least one ink from a color ink set onto a substrate to form a first pixel; and jetting a heliosing ink onto the first pixel to form a heliosed pixel, wherein the first pixel is substantially free of resolution diminution in the heliosed pixel.

The present invention also provides, in embodiments, a process wherein the foregoing process steps are accomplished in reversed order, that is, comprising:

jetting a heliosing ink onto a substrate to form a either a latent or patent heliosed first pixel; and jetting at least one ink from a color ink set onto the first pixel to form a heliosed pixel, wherein the resolution in the heliosed pixel is substantially the same as the resolution in the absence of the heliosing ink.

It is readily appreciated by one of ordinary skill in the art that the aforementioned resolution of the color of the first pixel is not diminished by the heliosing process, that is, the resolution of the first pixel is substantially or completely retained in the heliosed pixel. Similarly, when the process steps are accomplished in reverse order, the resolution of the color ink jetted on top of the first formed heliosing pixel is also not substantially diminished by the heliosing process.

When the process is accomplished in the aforementioned reversed order, the jetting of the heliosing ink first may create either a "latent" or "patent" heliosed first pixel. When a first formed heliosed first pixel is not visibly noticeable or perceptible to an observer it is a latent heliosed pixel. The latent heliosed first pixel is subsequently developed when combined with the subsequently jetted color ink or inks. Whether a first formed heliosed first pixel is visibly noticeable or perceptible to an observer can depend upon, for example, the chemical and physical properties of the substrate, the interaction of the heliosing ink with the substrate, the net color difference between the substrate and the heliosed first pixel, and the like considerations. When a first formed heliosed first pixel is visibly noticeable or perceptible to an observer, for example, when a heliosing ink formulation, such as a white or opaquing ink, is first jetted upon a high contrast or colored background there results a patent heliosed first pixel. It is readily understood by one of ordinary skill in the art that as the droplet volume of the heliosing ink formulation and the resulting substrate area coverage decrease, pixels which are patent at lower resolutions can be latent at higher resolutions.

Figure 1:
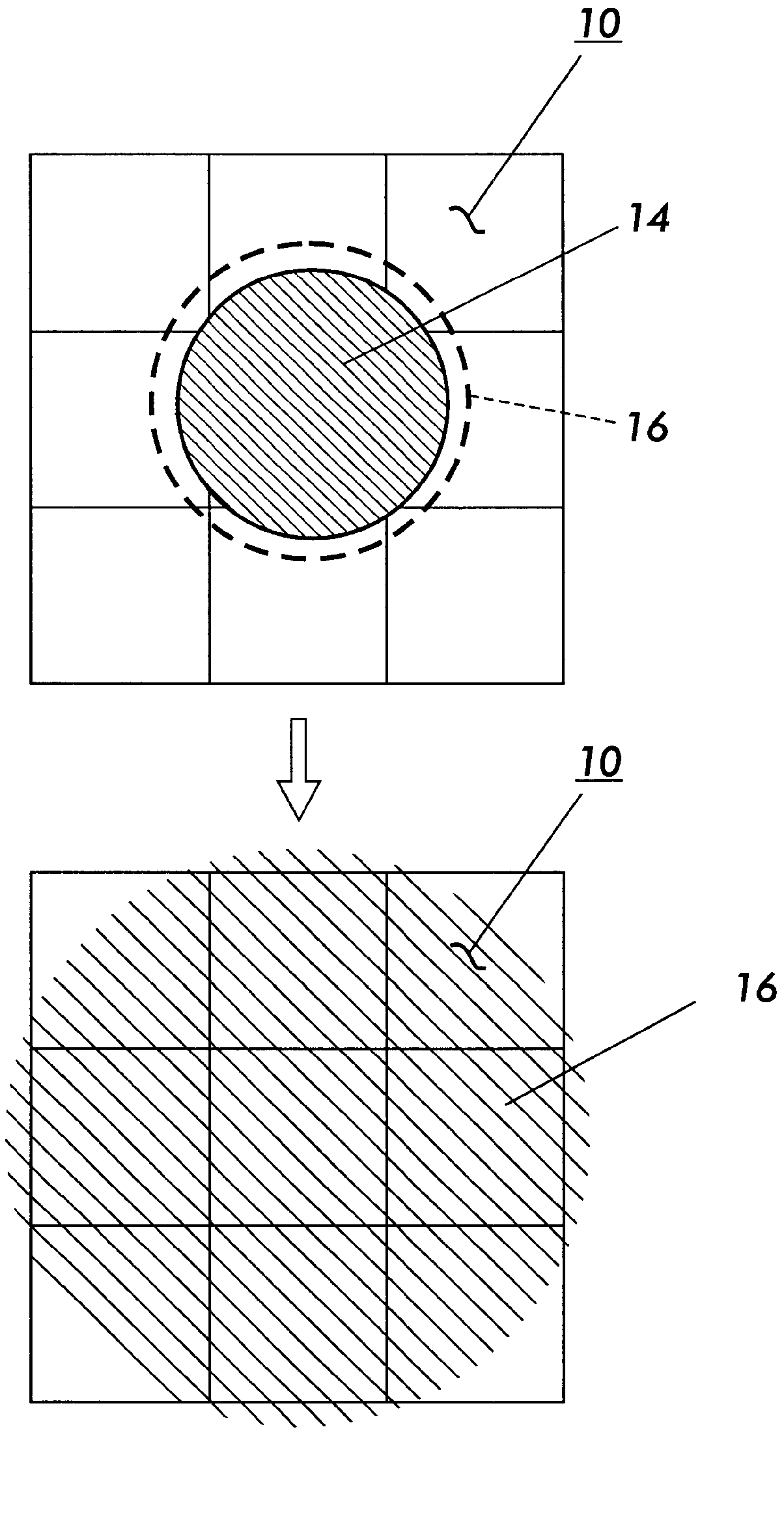
FIG. 1 illustrates an example of a spreading pixel process of the prior art.

Referring to the Figures, FIG. 1 illustrates an example of a spreading pixel process of the prior art, reference for example, the aforementioned U.S. Pat. No. 4,630,076, wherein a color pixel 12, residing within a 3×3 super pixel array 10, can be spread by depositing a colorless or white pixel 14 on top of the color pixel 12. Bleeding of the colorless or white pixel 14 together with the color pixel 12 is believed to produce a pixel 16, greatly expanded in area, which largely fills the area of the super pixel 10. This prior art process spreads the colorant material of color pixel 12 over a wider area, reducing the optical contrast of the colored region with respect to the background medium, but does not substantially diminish the overall amount of light absorbing colorant present in the superpixel. This prior art process does not change the gray level of the superpixel. The purpose of this prior art process is to reduce the visibility of color pixel 12 to human perception by lowering its optical contrast by spreading it over a larger area. However, the spreading of color pixel 12 over many adjacent pixel areas, as illustrated by new pixel 16, causes substantial resolution diminution in the color pixel and in the overall image. This prior art ink spreading process effectively replaces the fine resolution of the individual color pixels with the coarser resolution of a superpixel.

Figure 2:
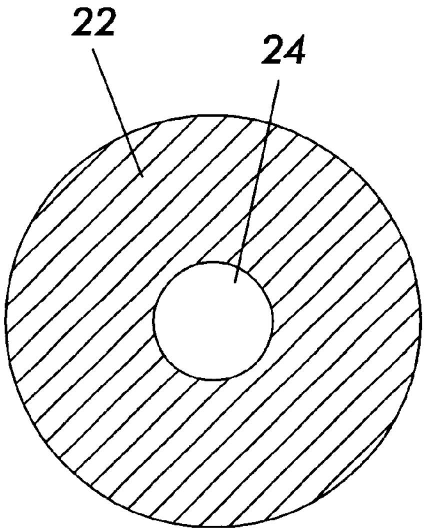
FIGS. 2 through 7 schematically illustrate examples of the heliographic imaging processes in embodiments of the present invention.
Figure 3:
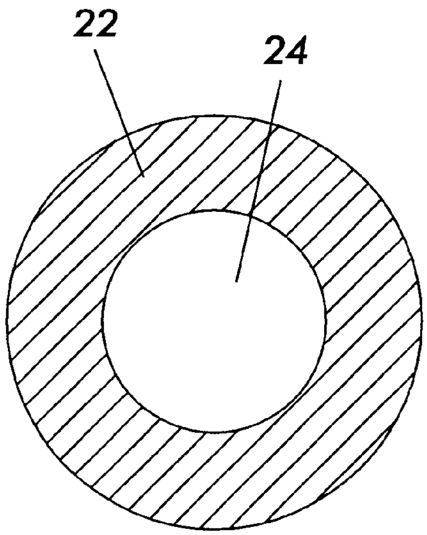
Figure 4:
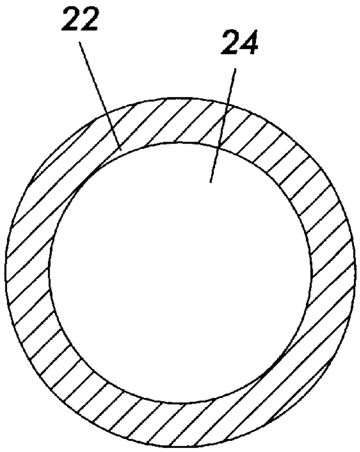

FIGS. 2 to 4 illustrate examples of the pixel specific heliographic imaging processes of the present invention which provide, in embodiments, jetting one or more inks from a color ink set onto a suitable substrate to form a first pixel of area 22, and thereafter jetting a heliosing ink formulation droplet 24 onto the first pixel to form a heliosed pixel. The heliosing ink formulation droplet 24 can occupy or cover various predetermined selected percentages of pixel 22 area, for example: about 25 percent, as exemplified in FIG. 2; about 50 percent, as exemplified in FIG. 3; and about 75 percent, as exemplified in FIG. 4.

Figure 5:
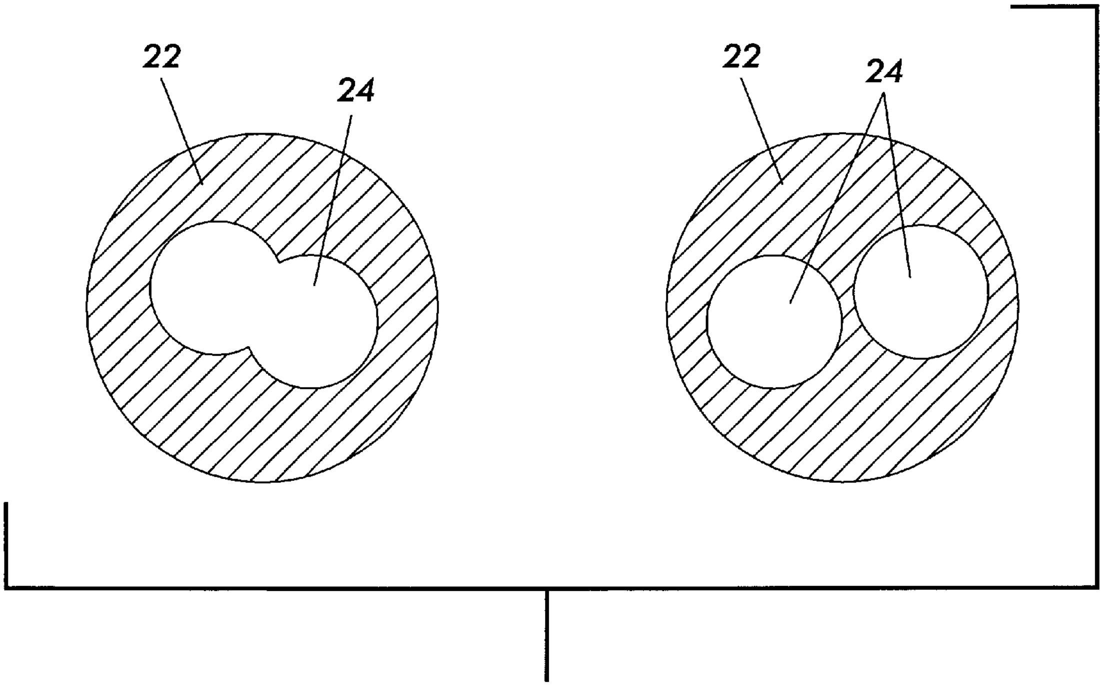
Figure 6:
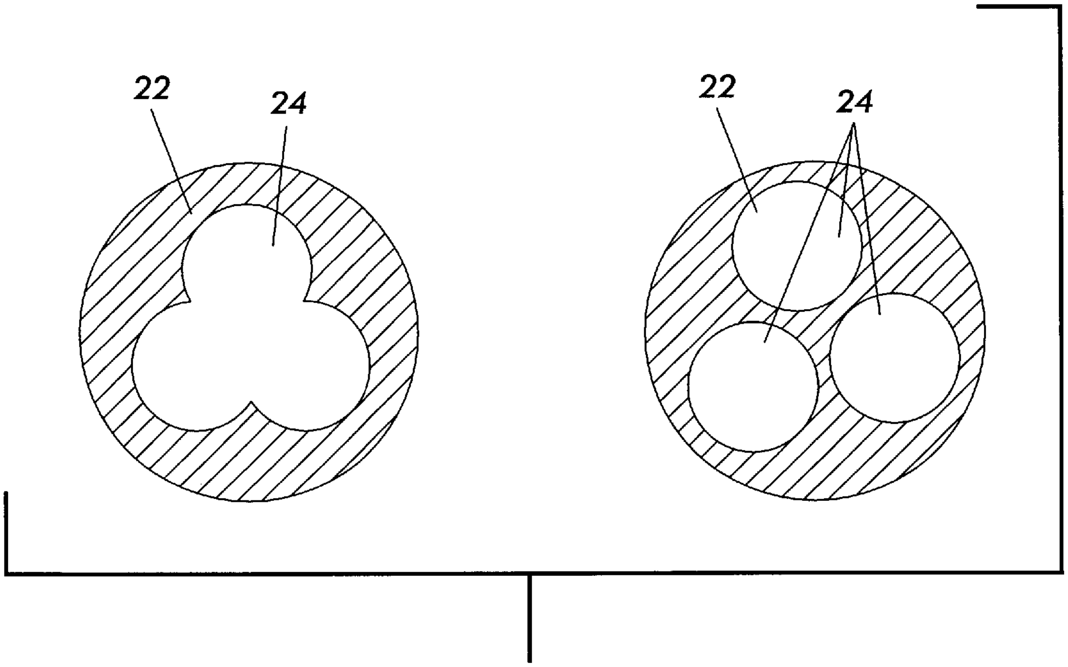

FIGS. 5 and 6 illustrate heliographic embodiments of the present invention which employ two or more heliosing ink formulation droplets 24 in combination with a single or individual color pixel 22. The multiple heliosing ink formulation droplets 24 can partially overlap each other to some extent, for example from about 1 to about 50 percent area overlap. Alternatively the multiple heliosing ink formulation droplets 24 can be entirely separated by at least some area of the color pixel 22, for example, from about 1 to about 50 percent area separation. The overlap or separation areas will depend upon, for example, the area of the color pixel, the area covered by the individual heliosing ink droplets, the extent of overlap of multiple heliosing ink droplets if any, and the number of the heliosing ink droplets.

It is readily evident to one of ordinary skill in the art that comparable area coverages can be obtained by applying the heliosing ink formulations droplets in different ways. Thus, for example, a single heliosing ink formulation droplet of appropriate volume can be jetted to achieve about 75 percent attenuation of color properties of the color pixel 22. Alternatively, the same or comparable level of attenuation of the color properties of the color pixel 22 can be obtained by jetting, for example, three heliosing ink formulation droplets of appropriate volume onto the same or similar color pixel 22 to achieve about 25 percent attenuation individually and about 75 percent, in the aggregate, attenuation or heliosing of color properties of the color pixel 22.

Figure 7:
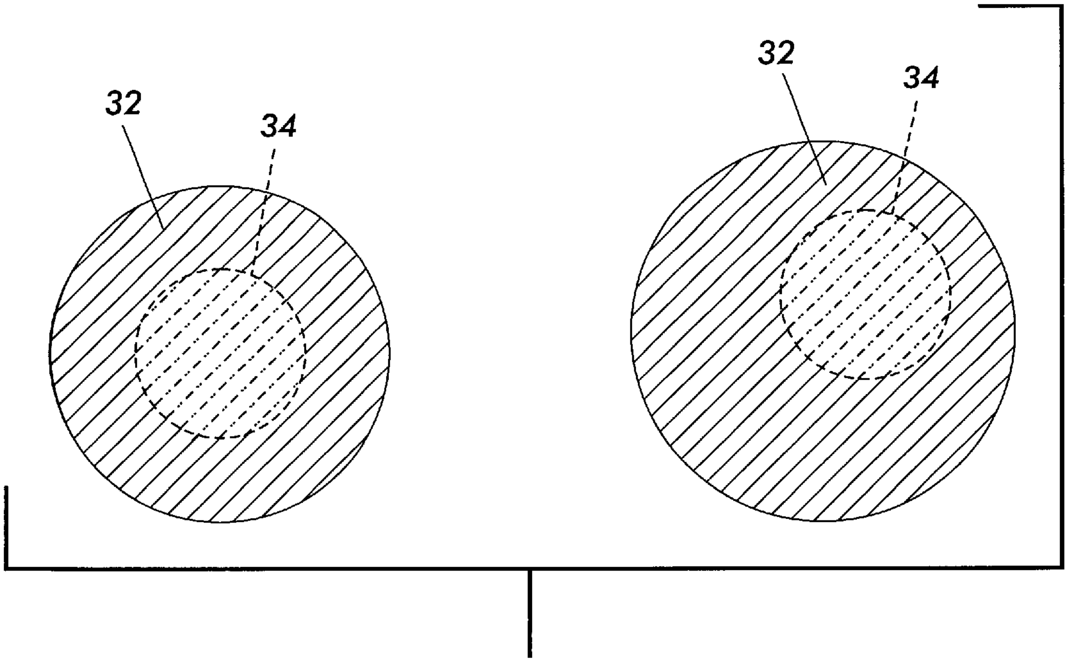

FIG. 7 schematically illustrates, in embodiments, an example of the alternative or reverse ink formulation jetting order which also accomplishes the heliographic imaging process of the present invention. Thus, for example, there is first jetted a heliosing ink formulation onto a substrate to form a first pixel 34 of area equal to about 0.5X; and thereafter there is jetted at least one ink from a color ink set onto and over the first pixel to form a color pixel 32 of area equal to X, and wherein the combination of the heliosing first pixel 34 and the color pixel 32 create a heliosed pixel which pixel possesses and presents a heliographic effect to an observer.

"Helios" (sun or light) and "heliography" (light-writing) as used herein includes, for example, lightening, whitening, or brightening materials; ink formulations thereof; and imaging and printing processes thereof, and further includes pixel specific image lightening, whitening, or brightening effects as illustrated herein. Similarly "heliosing" can, for example, latent or incipient lightening, whitening, or brightening pixels or processes, and "heliosed" can include, for example, patent or accomplished lightened, whitened, or brightened pixels or processes. The materials and processes of the present invention are capable of producing any or all of: whiter, brighter, or lighter individual pixels and whiter, brighter, or lighter multi-pixel images resulting therefrom. The helios materials and heliographic processes of the present invention relate to, for example, direct writing, such as drop on demand ink jet printing and imaging processes thereof and which processes can be accomplished by jetting liquid inks in accordance with the present invention and as illustrated herein.

The heliographic effect of the present invention can be accomplished by one or a combination of several mechanisms depending upon, for example, the materials selected and the order in which the selected materials are jetted in the image forming processes. The heliosing ink formulations useful in the present invention can include, for example, an obscurant, a bleachant, or a penetrant, and mixtures thereof, and as illustrated herein.

Generally, the heliosing or heliographic printing process can be accomplished with a color ink set which includes, for example, from 1 to about 5 different colored inks, and preferably from 2 to 4 different colored inks. The heliosing ink formulation when jetted onto a colored first pixel can cover, for example, from about 20 to about 80 percent of the area of the first pixel. The heliosing process can, in the aggregate, produce gray scale images that are substantially free of, for example, pixel bleeding, pixel spreading, pixel dot growth, pixel area expansion, combinations thereof, and related objectionable image defects. The absence of these and other pixel altering image defects contributes to the formation of superior image quality in the imaging forming processes of the present invention. The absence of the aforementioned pixel defects is readily evident by, for example, microscopically inspecting individual heliosed pixels or by normal viewing by an observer of heliographic images.

These and other image defects can be avoided by selection and jetting of the color ink set and the heliosing inks in accordance with the present invention. The process can produce gray scale images at resolutions, for example, of from about 200×200 spots per inch(spi) to about 1,200×1,200 spi, and preferably produce pictorial quality and high resolution gray scale images at from about 600×600 dots per inch(dpi) to about 1,200×1,200 dpi, wherein the dot or spot density per inch refers to the color ink spots or dots. It is readily appreciated by one skilled in the art that the heliosing effects and processes of the present invention are accomplished by jetting heliosing ink formulations with a drop size or sizes which are individually or collectively smaller than the preceding or subsequently jetted color ink drops.

The selection of the heliosing ink formulation can depend upon the image effects desired, and the heliosing ink can purposefully be selected to physically mix or not physically mix with the color ink or inks of the ink set when combined in a heliosed pixel. The light absorption of the heliosed pixel can be advantageously diminished by, for example, from about 20 to about 80 percent by the combination of the heliosing ink with the first pixel compared to the light absorption of the first pixel alone. The diminished light absorption of the heliosed pixel can provide, for example, from about 1 to about 5 additional gray scale levels to the color space of the first pixel. In embodiments of the present invention, there can be jetted from 1 to about 5 droplets of the heliosing ink formulation in forming the heliosed pixel. In embodiments, a color pixel can be formed first or second and can be accomplished by jetting, for example, from about 5 picoliters to about 200 picoliters of one or more colored inks on to a suitable substrate. A heliosed pixel can be accomplished by combining a color pixel with a heliosing ink by for example, jetting from about 2 to about 100 picoliters of a heliosing ink formulation onto the first formed color pixel. In embodiments, the jettings can be accomplished with, for example, an ink jet apparatus capable of jetting at least two to about five discrete ink formulations simultaneously onto a single pixel location.

The present invention can preserve or maintain the resolution or dot size of the first jetted pixel and provide for lightening or brightening of the pixels by, for example, blocking or interfering with the color absorptivity properties of the color pixel formed from jetting the heliosing ink onto the pixel formed from ink or inks of the color ink set.

Thus the heliosed pixels and resulting heliosed images of the present invention can possess a lower color density than a first pixel image formed from jetting one or more inks of the color ink set, for example, by from about 1 to about 50 relative percent.

The attenuated or diminished light absorption character of the heliosed pixel image can provide, for example, from 1 to about 5 additional gray scale levels to the color properties of the first pixel image, depending upon several factors, as described and illustrated below.

The helios ink, on a per drop basis, can interfere with, attenuate, or degrade, the color absorption properties of individual color pixels by at least some amount. For example, a helios ink can interfere with about one half of the colorant, such as one or more dyes or pigments, at a particular pixel location for each helios ink drop jetted, deposited, or printed. Thus the use of a single drop of a helios ink at a single pixel location can add one gray level to that pixel's potential complete gray scale in accordance with the following situations for a total of three gray levels:

1) blank, that is no drops jetted, neither color or helios inks;
2) only color ink drop(s) jetted; and
3) color ink in combination with a jetted helios ink.

If the amount of helios ink is chosen to, for example, interfere with about one-quarter(¼) of the colorant per helios ink drop, then even more gray levels can be achieved at each pixel location, for example, in accordance with the following situations affording a total of five(5) gray levels:

1) blank, that is no drops jetted;
2) only color ink drop(s) jetted;
3) color ink drop(s) jetted in combination with a single drop of a helios ink are jetted;
4) color ink drop(s) jetted in combination with a two drops of a helios ink are jetted; and
5) color ink drop(s) jetted in combination with a three(3) drops of a helios ink are jetted.

The helios ink droplets, in embodiments, are preferably physically smaller than the color ink droplets used to form a color pixel. The reduced size of the helios ink droplet provides superior control of the location and deposition of the helios ink in combination with the color droplet pixel, and the resulting "heliosing" effect. It is also readily appreciated by one of ordinary skill in the art that the extent of the "heliosing" effect can also be further controlled by regulating the relative size and number of individual helios ink droplets relative to the size of the companion color pixel.

A smaller physical droplet size for the helios ink can be readily and reliably be achieved, for example, by selecting either or both a smaller jet nozzle orifice or a smaller jetting chamber with a smaller displacement volume, for the jetting and delivery of the heilos ink to the substrate. Thus, for example, if the color pixel ink(s) are jetted at about 10 picoliters(pL), the helios ink can be jetted at from about 2 to about 5 pL.

At the low end of the volume range, for example, about 5 picoliters (pL) for a color first pixel and about 2 pL for the heliosing ink can be used to produce a 1,200×1,200 spi system. At the high end of the drop volume range, for example, 200 pL for the color first pixel and about 100 pL for the heliosing ink can be used to produce an approximate 200×200 spi system.

The present invention also contemplates, in embodiments, an ink jet recording apparatus comprising an ink jet deposition system which jets inks in accordance with either of the aforementioned jetting sequences, that is, where the heliosing ink is jetted second as a partial overcoat of the first jetted color pixel, or alternatively, in reverse order, where the heliosing ink is jetted onto the substrate first and before the ink or inks of the color ink set are jetted thereover.

Processes of the present invention can further comprise jetting a plurality of individual first pixels and then jetting at least one heliosing ink drop onto at least one of the first pixels to form at least one heliosed pixel. The presence of at least one heliosed pixel among a plurality of other non-heliosed pixels or heliosed pixels can provide a heliographic image.

Obscurant Inks

When the heliosing ink formulation selected is an obscurant ink formulation the heliographic effect of the present invention can be accomplished by one or a combination of mechanisms.

A first mechanism comprises substantial or complete opaquing and includes jetting a helios or heliosing ink so that an underlying surface, such as the receiver surface or image colorants, directly beneath the helios ink is substantially or entirely blocked or opaqued and thereby effectively precluded from interacting with ambient illuminating light. An obscurant ink formulation for accomplishing substantial or complete opaquing can be a formulation which is, for example, immiscible with and non-bleeding into the first pixel.

A second mechanism comprises partial opaquing and can include jetting a heliosing ink so that an underlying surface, such as the receiver surface or image colorants, directly beneath the heliosing ink is only partially blocked or opaqued and thereby effectively permits at least some interaction of ambient illuminating light with the underlying surface and precludes only a portion of the underlying surface from interacting with ambient illuminating light.

Thus heliosed pixel image area which is covered by a subsequently jetted heliosing ink can, in embodiments, completely obscure the first pixel area that lies between the obscurant ink and the substrate. In other embodiments the heliosed pixel area covered by the obscurant ink incompletely obscures the first pixel image area that lies between the obscurant ink and the substrate.

By way of illustrative example, a preferred embodiment of the present invention comprises a heliosing ink which is a colorless obscurant or “anti-colorant” ink formulation. The colorless obscurant or anti-colorant ink formulation can be, for example, a white ink made with a white titanium dioxide colorant or pigment and which pigment can be present in an amount of from about 0.1 to about 20 weight percent based on the total weight of the white ink. In embodiments the colorless obscurant ink does not mix with or interact with any of the other colored inks contained in the first pixel. In other embodiments the colorless obscurant ink can mix with or interact with one or more of the other colored inks contained in the first pixel at least to some extent. In another preferred embodiment, the heliosing ink comprises a white obscurant ink, that is, an ink that contains a colorant package which imparts a snowy white appearance to, for example, an otherwise clear or transparent formulation, such as a white pigment, for example, titanium dioxide ($TiO_2$) and related white pigments, when the heliosing ink jet ink is deposited on most opaque or non-transparent image receivers. Other obscurant or anti-colorant ink formulations are readily available and can be prepared in many ways, for example, in accordance with or by appropriately modifying one or more of the following references. U.S. Pat. No. 5,710,195, discloses opacifying ink formulations which include dyes and soluble resins. These opacifying formulations can be adapted for use as either obscurant ink formulations or as penetrant ink formulation of the present by, for example, removing the colorant or dye component therefrom and adjusting the concentration of ingredients accordingly to achieve the heliographic imaging effects as disclosed herein. U.S. Pat. No. 5,674,923, discloses non-pigmented opaque jet ink compositions which can also be readily adapted for use in the present invention. See also U.S. Pat. Nos. 4,680,058 (white ink composition) and 5,451,987 (apparatus for jetting inks that require an opaque white ink).

The obscurant ink of the present invention can include, for example, at least one colorless light absorbing material and a liquid carrier. The first pixel in embodiments, can be accomplished by jetting, for example, three colored inks that in combination produce a satisfactory process black pixel. The heliosed pixel can be obtained by thereafter selectively jetting, as prescribed herein, an obscurant ink comprised of, for example, a titanium oxide pigment onto the first pixel.

A plurality of individual first pixels can be jetted before a plurality of individual obscurant ink drops are jetted onto the plurality first pixels to form a plurality of the heliosed pixels, and in aggregation, heliosed images.

The obscurant ink can be jetted onto a portion of the first pixel, and preferably the obscurant ink which is jetted onto the first pixel is substantially within the area defined and covered by the first pixel, and more preferably the obscurant ink is entirely within the boundary established by the first pixel, that is, the obscurant ink is not jetted beyond the area covered by the companion first pixel. The jetted obscurant ink can cover, for example, from about 1 to about 50 percent of the image area covered by the first pixel, and preferably from about 10 to about 40 percent of the substrate area covered by the first pixel.

Jetting the obscurant ink onto the first pixel modifies the optical density of the first pixel and thereby provides a heliosed pixel which exhibits the helios effect. Jetting the obscurant ink onto the first pixel causes the resulting heliosed pixel to return more white light to an observer than a first pixel which is otherwise free of obscurant ink. The jetting of the obscurant ink formulation preferably does not physically mix with the ink or inks contained in color image of the first formed first pixel. Conversely, where the heliosed pixel is formed by first jetting an obscurant ink onto a substrate followed by jetting one or more colored inks thereover, the colored inks preferably do not physically mix with the obscurant ink formulation. The absence of physically mixing means that on a microscopic level the colored inks and the obscurant ink do not intimately mix or blend to afford color changes. Instead, there is preferably physical segregation or separation of the colored inks and the obscurant which separation does not generally produce microscopic color changes but does typically effect a change in the color perceived by an observer, that is, there results measurable perceptual color changes.

The obscurant ink can be deposited on the receiver, for example, prior to, during, that is, simultaneously, or after the jetting of the inks in the color ink set. In embodiments the obscurant ink is preferably jetted after the first pixel has been jetted onto the receiver. When the obscurant ink contains, for example, an opacifier material, such as a non-absorbing colorless or white pigment, the obscurant ink is preferably deposited on the receiver after the color inks are jetted, for example, to minimize or preclude mixing of the obscurant ink with the any of the previously jetted color inks.

A desired and beneficial consequence of jetting an obscurant ink is that the light absorption properties of the color ink image can be advantageously diminished and the light reflectivity properties of the heliosed pixel image can be advantageously increased. The diminished light absorption observed in the heliosed pixel image can be, in embodiments, from about 1 to about 50 percent. The diminished light absorption can be conveniently accomplished by, for example, opacifiers contained in the obscurant ink which can physically block or absorb light, that is ambient reflected light or image illuminating light, and thereby effectively prevent or diminish the level of light reaching the colorants contained in the heliosed pixel formed by jetting the colored ink set. The diminished light absorption by the first pixel is accomplished by, for example, one or more opacifying agents contained in the obscurant ink. The opacifying agent or agents can physically block light from reaching the colorants contained in the first pixel. Alternatively, when the obscurant ink is jetted onto the substrate first, the opacifying agent or agents in the obscurant ink formulation can function as a physical dispersant which can physically displace colorants contained in the subsequently jetted colored ink or inks from the space on the substrate occupied by the obscurant ink formulation thereby ensuring the desired lightening or brightening effect in the resulting heliosed pixel.

An obscurant ink as used and illustrated herein includes jettable ink formulations which are for example, non-transparent or opaque inks, or alternatively, only weakly transparent or only slightly non-opaque. The ingredients of the obscurant ink can include, for example, pigmented inks, light scattering compounds, opacifiers, reflective or retro-reflective materials, dye absorbance reducing materials, and mixtures thereof.

Bleachant Inks

Consistent with the foregoing jetting application of heliosing obscurant ink formulations in combination with an ink or inks of a color ink set to form heliosed pixels, it is now readily evident to one of ordinary skill in the art that a bleachant or bleaching agent can be substituted for, or included with, the obscurant ink additives to achieve the same, similar, or further enhanced heliosed pixels and heliosed images. Suitable bleachants include for example, peroxide compounds, perchlorate compounds, and the like known compounds, and stable mixtures thereof.

Heliosing bleachant ink formulations can be readily prepared, reference for example, U.S. Pat. No. 5,552,811, which discloses discharging a bleaching agent to decolor ink, for example, in addition to a liquid discharging head to discharge ink to a printing medium. U.S. Pat. No. 4,413,266, discloses an ink eradicator formulation developed for erasing or correcting impact printing and which formulation removes indicia of the ink from the substrate by chemical reaction.

The diminished light absorption of the colored pixel can be accomplished by alteration of the light absorption properties of the colorants therein by, for example, a chemical reaction of one or more chemical reactants contained in the bleachant ink formulation with one or more of the colorants in the color pixel.

In embodiments the heliosing bleachant ink formulation physically mixes with the color ink or inks of the first pixel to produce a color diminution of the color pixel by, for example, chemical or physical interaction of the bleachant with the colorant so as to reduce the light absorption properties of the colorant. Mechanisms of interaction include, but are not limited to, altering one or more chromophores in the colorant molecules by for example, complexation, coordination, chemical modification, and the like interactions, including through bond interactions and through space interactions, which can result in a measurable change in the aggregate light absorption properties of the colorant ink(s) of the heliosed pixel.

The bleachant ink can be formulated to selectively and completely bleach only that portion of the color pixel which is directly underlying or overlying the heliosing ink generated pixel. In other embodiments it is desirable for the bleachant ink to incompletely bleach the color pixel which is directly underlying or overlying the heliosing ink generated pixel.

The bleachant ink can interact with the colorants contained in the jetted colored ink set to cause a change in the absorbance properties of at least one of the colorants. The bleachant ink can include, for example, at least one pigment reactive material or dye reactive material, and a liquid carrier.

Penetrant Inks

Consistent with the foregoing jetting application of heliosing obscurant or heliosing bleachant ink formulations in combination with an ink or inks of a color ink set to form heliosed pixels, it is readily evident to one of ordinary skill in the art that a penetrant or penetrating agent can be substituted for, or included with, the aforementioned heliosing ink additives to achieve the same, similar, or further enhanced heliosed pixels, heliosed images, and heliosing effects.

In embodiments the penetrant ink can physically mix and interact with colorants contained in the ink or inks of the color pixel. In embodiments the penetrant ink formulation can comprise at least one surfactant material, and a liquid carrier.

The penetrant ink formulation can include one or more of the following additives: colorant penetrants, dye dispersion reducing materials, colorant agglomerating agents, and mixtures thereof. A preferred penetrant ink is comprised of a surfactant as indicated herein and a low molecular weight diol, such as propylene glycol. Heliosing penetrant ink formulations can be readily prepared, reference for example, the following U.S. patent Nos., which disclose related penetrant liquids that can be readily adapted for use in the present invention. Examples of suitable penetrants include materials disclosed in, for example, U.S. Pat. Nos.: 5,658,376, 5,972,086; 5,969,112 (flocculating dyes which reduce bleed between two inks when they are applied side by side; a first ink comprises the flocculating dye which flocculates the dispersant-pigment of the second ink); U.S. Pat. No. 5,958,121 (penetrants minimizing intercolor bleeding and drying time; impart a low surface tension); U.S. Pat. No. 5,928,419 (promoting penetration of recording liquid and promoting drying properties; includes glycol ethers in water-based solvent; above about 5% by weight causes feathering of prints and print-through); U.S. Pat. No. 5,925,692 (1,2-hexanediol and acetylene derived compounds penetrants); U.S. Pat. No. 5,846,663 (ketene multimer sizing agent for paper); U.S. Pat. No. 5,180,425 (aqueous ink jet formulations including polyol/alkylene oxide condensate cosolvents); and copending U.S. Ser. No. 09/106,527 entitled "Inks for Ink Jet Printing With Reduced Intercolor Bleed," which discloses an ink composition comprised of water, an anionic dye, and monoquaternary cationic penetrants.

Penetrant ink formulations of the present invention can include other additives or materials that may promote, for example, mixing with, or segregation of, the heliosing ink and to colorants of the color pixel, including, for example, penetrating surfactants or sizing agents which can promote or facilitate capillary action of the heliosing ink formulation into the substrate.

When a penetrant ink formulation is selected for use in the present invention the substrate can preferably have a highly light reflecting upper surface region, for example, as found in high quality coated paper stocks. In embodiments, the color ink of the first pixel in the portion of the heliosed pixel which is covered by the penetrant ink preferably completely penetrates the light reflecting upper surface region of the substrate. In other embodiments, the color ink of the first pixel in the portion of the heliosed pixel covered by the penetrant ink preferably only incompletely penetrates the substrate.

In embodiments, the penetrant ink is preferably formulated so that when the penetrant ink contacts the color ink of the first pixel, the penetrant ink produces only incomplete penetration of the color ink through the light reflecting upper surface region of the substrate thereby producing a partial heliosing effect. This preference recognizes inherent difficulties of completely migrating all the colorant molecules for the upper surface regions of the substrate, for example, on a high quality coated paper stock, such as coated papers for ink jet and layered or multi-ply papers.

In embodiments, the penetrant ink can also be formulated so that when the penetrant ink contacts the color ink of the first pixel the penetrant ink produces substantially complete penetration of the color ink from and through the light reflecting the upper surface regions of the substrate thereby providing a substantially complete heliosing effect in the heliosed region of the pixel. Consideration is also preferably given to matching or compatibilizing the penetrant ink formulation with the properties of the color ink set inks to achieve the desired partial or substantially complete heliosing effect with a penetrant ink formulation.

The portion of the color ink of the first pixel which is covered by the penetrant ink in the heliosed pixel, completely penetrates the light reflecting upper surface region of the substrate and thereby displaces colorant particles from the upper surface region. The action of the penetrant ink formulation includes exposing paper fibers by sweeping away the colorant particles therefrom. The penetrant formulation can interact with paper fibers to, for example, lower the surface tension of the paper.

The penetrant ink in embodiments is preferably accomplished with a multi-ply paper substrate, and with substantially smaller penetrant drops, for example, from about 2 to about 10 pL drops of penetrant ink formulation with respect to about a 15 pL color ink drop, to ensure that the penetrant ink formulation remains within the boundaries of the color pixel, for example, penetrant drop volumes of about 2, 4, 6, 8, and 10 pL per about 15 pL of a color ink drop provide various proportionate heliosing levels. A penetrant ink formulation can be any suitable penetrating compound or compounds, with or without a carrier vehicle present, including but not limited to, surfactants, alcohols, and mixtures thereof. A carrier vehicle may not be necessary where the penetrant compound is sufficiently liquid, wetting, sufficiently non-viscous, and relatively inexpensive. Typical penetrant formulations include a 2 to about 10 weight percent aqueous solution of a suitable surfactant or a 5 to about 7 weight percent aqueous solution of a suitable alcohol compound.

The penetrant ink when jetted onto the first pixel can cover, for example, from about 20 to about 80 percent of the area of the first pixel. However, since the penetrant ink formulation has greater potential for lateral spreading in addition to penetrating the depth or thickness of the paper substrate the penetrant ink when jetted onto the first pixel preferably covers, for example, from about 10 to about 50 percent of the area of the first pixel. Further, in view of the foregoing lateral spreading of the penetrant ink formulation, in embodiments, it is preferred that from 1 to about 2 penetrant ink formulation droplets are deposited in the color pixel in forming a heliosed pixel.

The color ink set can comprise a variety colored of inks, for example, process color or other colored inks, such as cyan, magenta, yellow, black, and a liquid carrier, and mixtures thereof.

The receiver substrate can be any known and suitable liquid ink receiver material, such as, paper, transparency materials, plastics, polymeric films, metals, treated cellulosic materials, natural or synthetic fibers, wood, and the like materials, and mixtures thereof.

The jetting and imaging processes of the present invention can be accomplished with any suitable ink jet apparatus capable of jetting drops of different sizes; larger drops for the color ink set and smaller drops for the heliosing ink. Other suitable ink jetting apparatus include those printheads capable of simultaneously jetting at least two inks to about five discrete ink formulations reference, for example, U.S. Pat. No. 5,731,827, to Mantell, et al., which discloses a liquid ink printing apparatus for printing images that includes a printhead having a plurality of nozzles wherein a single power pulse causes two or more nozzles to eject ink simultaneously.

The ink jet system can comprise, for example, a cartridge and one or more ink jet nozzles in communication with the cartridge for determinably and simultaneously jetting each of the inks in accordance with the present invention.

The receiver substrate can be any suitable material which is capable of at least partially absorbing the liquid image, and is preferably opaque sheet materials, such as paper, plastics, polymeric films, metals, treated cellulosics, natural or synthetic fibers, wood, and mixtures thereof. Transparency materials, although operable as a receiver, are less desirable and less suitable receiver substrate materials in embodiments of the present invention since the gray scale imaging result is achieved by reflectance from opaque receivers rather than transmission through transparent substrates. However, it is readily understood by one of ordinary skill in the art that a transparency receiver may indeed be a suitable receiver when used, for example, to prepare a reflectance type image or opaque backed image, for example, by first preparing an ink jet image on a transparency receiver and thereafter backing the image with an opaque material such as used in preparing high gloss color ink images. Absorbency of the receiver substrate promotes image quality by reducing drying times and undesired mixing of respective or adjacent ink images. Preferably the ink jet image formed on the receiver substrate dries in less than about 15 seconds, such as from about 1 to about 15 seconds.

The present invention thus provides a modification to the optical density, on a pixel by pixel basis, of the pixels printed by color ink jets. The modification of the optical density can be accomplished, for example, by increasing the amount of incident white light which is reflected back by the modified pixel. The modification can be accomplished in a variety of ways, for example, by altering the physical properties of the ink and the resulting image properties including, for example, adding white light scattering compounds, adding a reflective layer, degrading the light absorbance of the deposited dye or pigment, modifying the media penetration properties of the deposited standard dye ink, degrading or reducing the level of particle dispersion of the dye in the deposited standard dye ink, modifying the fiber coverage of the standard dye ink, and the like methods and combinations thereof. The heliographic ink jetting processes of the present invention can accomplish equivalent imaging work of an ink jetting system that employs at least one additional ink jetting nozzle but at considerably reduced cost and complexity. In the present invention, at every pixel location a heliosing jet can potentially deposit or write a heliosing material which has the effect of locally increasing the ambient external light reflectance and decreasing the internal light absorbance of a given pixel that would otherwise yield a standard reflectance for any or all of one or more color inks in the absence of the heliosing ink jet writing. To be effective the heliosing ink and its jetting should, for example, alter the reflectance of at least one or both of the cyan and magenta standard inks, and additionally preferably, alter the reflectance of either or both the yellow and the black standard inks.

In embodiments of the present invention, there can be provided a printing machine comprising an ink jet printer with an ink jet jetting system, for example, an integrated ink jet print head including an cartridge or supply reservoir and jetting means, such as a nozzle or orifice, which controllably delivers white ink to the receiver substrate.

The colored ink compositions of the present invention can comprise conventional ingredients including, for example, an aqueous liquid vehicle, a colorant, and optional performance additives.

The colorant particles can have a particle size distribution where at least about 75 percent, for example, from about 70 to about 90, of the particles have a diameter below about 0.15 microns, that is, for example from about 0.01 to about 0.14 microns in volume average diameter with the remaining particles in the dispersion having a diameter less than or equal to about 0.5 microns, such as from about 0.5 to about 1 micron. More specifically the inks of the present invention are comprised of a major amount of water, at least one colorant, such as pigment particles, especially carbon black, alkylene glycols, such as ethylene glycol, and other known ink additives such as biocides, sulfolane, and the like. Also, the present invention relates to high resolution printing processes comprising applying the inks in image-wise fashion to a receiver substrate wherein gray scale color printing and pictorial color quality can be economically achieved.

Ink formulations used in the present invention can further include known performance or value enhancing additives such as biocides, humectants, chelating agents, viscosity modifiers, and the like, and mixtures thereof. Other optional additives include adjuvants such as butyl carbitol type solvents, and ionic surfactants such as sodium lauryl sulfate.

The inks can possess a latency of at least 20 seconds, for example, from about 20 to about 40 seconds, in a printer having at least one nozzle of a channel width or diameter ranging from about 10 to about 40 microns, and wherein the ink remains stable for extended time periods, up to a year of closed storage at ambient conditions with no settling or jelling.

The colorant particles can be pigments such as carbon black, magnetites, and colored pigments for color printing applications as identified herein, and mixtures thereof, and can be selected in an amount of from about 1 to about 20 weight percent, preferably in an amount of from about 2 to about 7 weight percent of the total ink mixture, and more preferably from about 4 to about 6 percent by weight and most preferably from about 5 to about 6 percent, although the amount can be outside of these ranges. The colorant can also be, or in addition to a pigment, include one or more dye compounds which are at least weakly or substantially soluble in the final ink formulation, and can be present in amounts of from about 0.1 to about 15 weight percent and preferably from about 0.1 to about 10 percent by weight based on the total ink mixture. When the colorant is a pigment, there is selected preferred pigment particle sizes in the final ink formulation of from about 0.05 to about 10 microns, and preferably from about 0.05 to about 5 microns, and more preferably from about 0.05 to about 4 microns.

The colorant for the ink compositions of the present invention is preferably a pigment, although it is readily understood by one of ordinary skill in the art that non pigment compounds can be used in place of a pigment or in addition to a pigment or pigments. The pigment is preferably carbon black, examples of other pigments include cyan, magenta, yellow, red, blue, green, brown, mixtures thereof, and the like. Preferred carbon black pigments for use in the present invention include LEVANYL® and CABOJET® 300 carbon black from Cabot Corporation, and FLAME BLACK® carbon black from Prolabo Corporation. Examples of suitable black pigments include other known carbon blacks such as channel black, furnace black, lamp black, and the like. Colored pigments include red, green, blue, brown, magenta, cyan, and yellow particles, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido)phthalocyanine, X-copper phthalocyanine pigment, listed in the color index as CI 74160, CI Pigment Blue, and Anthrathrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, Permanent Yellow FGL, and the like. Preferred pigment dispersions include carbon blacks, such as Hostafine Black (T and TS), Sunsperse 9303, and more preferably LEVANYL BLACK A-SF and CABOJET® 300.

Preferably, the pigment particles are of a size range which enables a stable colloidal suspension of the particles in the liquid vehicle and to prevent clogging of the ink jet nozzle channels when the ink is used in a thermal ink jet printer. Preferred average particle diameters are generally from about 0.001 to about 5 microns, and more preferably from about 0.01 to about 3 microns, although the particle size can be outside these ranges. A more preferred pigment particle size range includes particles having at least 70% of the particles being below about 0.1 micron with no particles being greater than 1.0 micron, as measured with a Hosakawa CAPA 700 Particle Size Analyzer. An even more preferred pigment particle size range includes particles having at least 90% of the particles below about 0.1 microns with no particles being greater than 1.0 micron.

Polymeric performance additives can also be added to the inks to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines modified with polyethylene oxide and polypropylene oxide, such as the DISCOLE® series available from DKS International, Tokyo, Japan, the JEFFAMINE® series available from Texaco, Bellaire, Tex., and the like additives. Polymeric additives may be present in the ink in amounts of from 0 to about 10 percent by weight, preferably from about 0.001 to about 8 percent by weight, and more preferably from about 0.01 to about 5 percent by weight, although the amount can be outside these ranges.

Further optional performance additives to the inks include biocides such as is DOWICIL 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount can be outside these ranges, penetration control additives such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount can be outside these ranges, pH controlling agents such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges.

Other examples of suitable ink additives include those illustrated in U.S. Pat. Nos. 5,223,026 and 5,207,825, the disclosure of each of which are totally incorporated herein by reference.

The inks of the present invention can be prepared by any suitable conventional process and variants thereof, for example, mixing water, a pigment, and a non-ionic surfactant, for example, Triton X-100™ of the formula $R—C_6H_4—(—O—CH_2—CH_2)_n—OH$ where R has about 8 carbon atoms, and n is an integer of about 10; attriting the mixture until the pigment particles have an average particle diameter of from about 0.001 to about 20 microns; optionally heating the mixture; and optionally admixing the ink with additional aqueous liquid vehicle, such as water, and optionally a humectant to provide an ink with a viscosity of about 10 centipoise; and thereafter further refining the ink if desired by, for example, centrifugation and filtration to remove pigment particles and the like with an average particle diameter of greater than about 1 micron.

Aqueous ink compositions according to the present invention may also be provided by mixing the formed inks with humectants, and other ink additives. The mixing can be done by various methods including homogenizing, sonification, microfluidization, mechanical mixing, magnetic stirring, high speed jetting, and the like. The sonification process is preferred since such process provides a homogeneous dispersion by evenly distributing the dispersant throughout the pigment dispersion. The stabilized dispersed pigment can be used as an ink as is, but preferably the thoroughly mixed pigment ink mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging is preferably conducted for a time sufficient to remove large size particles and at a rate of about 4,000 to 8,000 rpm. The continuous centrifuge process is very useful in the commercial production of large quantities of pigment ink for the separation of large pigment particles from the ink. The ink is also preferably subjected to a filtration process which utilizes various commercial filtration media including cartridges constructed from nylon, polyester, TEFLON®, polysulfone, and other suitable polymeric materials; membranes; porous ceramic media; cloth; and the like. The filter is of a size that removes particles greater than about 3 microns, preferably greater than 1.2 micron, and more preferably greater than about 1 micron. Any suitable filtration method, such as continuous and/or batch filtration methods, may be used. Continuous filtration methods are preferred for large scale production of pigment inks. Inks which have been centrifuged and filtered so as to preferably remove particles greater than 1 micron in size from the ink are suitable for use as ink jet inks because of their ability to not clog the ink jet and their long latency and jetting stability.

Inks of the present invention can be formulated in an aqueous liquid vehicle such as deionized water and homogenous mixtures of water and suitable miscible organic solvents, and the aqueous liquid vehicle can be present in an amount of from about 75 to about 99 weight percent of the total ink composition.

The liquid vehicle of the inks include a major amount of water, for example from about 50 to about 90, and preferably from about 75 to about 80 weight percent, and may comprise a mixture of water and a miscible organic component, such as glycols, for example, ethylene glycol, propylene glycol, diethylene glycols, glycerine, dipropylene glycols, polyethylene glycols, polypropylene glycols; amides; ethers; carboxylic acids; esters; alcohols; organosulfides; organosulfoxides; sulfones; dimethylsulfoxide; sulfolane; alcohol derived compounds, such as carbitol, butyl carbitol, CELLUSOLVE, and ethers thereof; amino alcohols; ketones; and other water miscible materials, and mixtures thereof.

The inks of the present invention can optionally contain one or more known additives such as biocides, humectants, chelating agents, viscosity modifiers, and mixtures thereof, including glycols in an amount of from about 10 to about 20 weight percent, and more preferably from about 12 to about 16 weight percent, sulfolanes, in an amount of from about 2 to about 6 weight percent, and more preferably about 2 to about 4 weight percent, biocides in the amount of about 0.01 to about 0.1 weight percent, and surfactants, for example, DOWICIL 200, in the amount of about 0.01 to about 0.1 weight percent. The humectant can be for example, ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, CELLUSOLVE, ether derivatives, amino alcohols, ketones, and mixtures thereof, and can be present in an amount of from about 3 to about 60 percent by weight of the total weight of the ink composition When mixtures of water and water miscible organic liquids are selected as the liquid vehicle, the water to organic ratio may any effective range, and typically is from about 100:0 to about 30:70, preferably from about 97:3 to about 50:50, although the ratio can be outside these ranges. The non-water component of the liquid vehicle generally serves as a humectant which can have a boiling point higher than water (100° C.). The pigment dispersion can be mixed with different humectants or solvents in ink jet inks including ethylene glycol, diethylene glycol, propylene glycol, dipropylene glycol, polyethylene glycols, polypropylene glycols, glycerine, trimethylolpropane, 1,5 pentanediols, 1,6-hexanediols, diols and triols containing from about 2 to about 10 carbons, sulfoxides for example, dimethylsulfoxide, alkylphenyl sulfoxides, and the like, sulfones such as sulfolane, dialkyl sulfones, alkyl phenyl sulfones, and the like, amides is for example N,N-dialkyl amides, N,N-alkyl phenyl amides, N-methylpyrrolidinone, N-cyclohexylpyrrolidinone, N,N-diethyltoluamide, and the like, ethers such as alkyl ether derivatives of alcohol, ether diols, and ether triols including butylcarbitol, alkyl polyethyleneglycols, and the like, urea, betaine, the thio (sulfur) derivatives of the aforementioned compounds, for example, thioethylene glycol, trithioethylene glycol, and the like. Desired penetrants, water soluble polymers, pH buffer, biocides, chelating agents, such as EDTA and the like, and other optional additives can also be used.

Another important measured property for an ink jet ink is the latency or decap time, which is the length of time over which an ink remains fluid in a print head opening or nozzle when exposed to air and, therefore, capable of firing a drop of ink at its intended target. Latency is the maximum idling times allowed for ink to be jetted by a printer with a speed equal to or greater than about 5 meters per second which is equivalent to an ink traveling a distance of 0.5 mm in less than 100 microseconds without a failure. The latency test is accomplished with the print head or nozzles uncovered or decapped and generally at a relative humidity of about 15 percent. The latency time interval is the longest length of time that the print head, uncovered, will still fire a specified drop without drop displacement or loss of density. The longer the latency time rating, the more reliable and desirable the ink. Many of the inks of the present invention possess of these characteristics. Generally, the inks possess excellent latency of at least about 10 seconds, more generally on the order of about 40 seconds to greater than about 1,000 seconds, with a minimum latency of at least 10 seconds being preferred. The inks of the present invention can have a jetting latency of from about 1 to about 20 seconds, and preferably from about 25 to about 100 seconds.

The viscosity of the inks can be from of about 1.0 cP to about 5.0 cP, and exhibit a drying time of no more than about 15 seconds when jetted onto plain paper in an ink jet printing process at ambient conditions. The viscosity of the ink composition is preferably less than about 3.0 cps(cP), more preferably less than about 2.5 cps, and even more preferably about 2 to about 2.8 cps.

The present invention provides imaging processes comprising the development of an image with the ink compositions as disclosed and illustrated herein in an ink jet printing machine. An exemplary imaging process comprises applying in image-wise fashion to a receiving substrate in an ink jet printer having at least one nozzle of a channel width or diameter ranging from about 1.0 to about 4 microns and wherein high resolution images result, for example, a preferred ink jet printing apparatus employs a thermal ink jet printing process and droplets of ink are caused to be ejected by selectively heating the ink and wherein there are provided moderate to high resolution, for example, 300, preferably 600, and more preferably 1,200 spots per inch(spi), and wherein the ejection is preferably accomplished on-demand. Thus there are provided processes for generating images on a substrate comprising incorporating one or more ink compositions of the present invention into an ink jet printing apparatus and causing droplets of the ink composition to be ejected in an imagewise pattern onto the substrate.

The inks can be selected for use in ink jet printing processes, and especially thermal ink jet processes and wherein image smearing is minimal, or avoided. Moreover, images developed with the inks of the present invention enable ink jet prints with excellent resolution, acceptable density, excellent waterfastness, minimum or very low show through, excellent MFLEN, and little or no stitch mottle image defects.

Ink jet printing can be considered a non-impact printing method that produces droplets of ink that are deposited on a substrate such as paper or transparent film in response to an electronic digital signal. Thermal or bubble jet drop-on-demand ink jet printers have found broad application as output devices for, for example, personal computers in the office and the home.

In existing thermal ink jet printing devices, the print head typically consists of one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels, at predetermined distance from the nozzles. The resistors are individually addressed with a current pulse to momentarily vaporize the ink and form a vapor bubble which in turn displaces or expels an ink droplet. As the bubble grows, the ink rapidly bulges from the nozzle and is momentarily contained by the surface tension of the ink as a meniscus. This is a very transient phenomenon, and the ink is quickly propelled toward a receiving print sheet. As the bubble begins to collapse, the ink still in the channel between the nozzle and bubble starts to move towards the collapsing bubble, causing a volumetric contraction of the ink at the nozzle and resulting in the separation from the nozzle of the bulging ink as a droplet. The feed of additional ink can provide the momentum and velocity for propelling the droplet towards a receiving print sheet, such as a piece of paper. Since the droplet of ink is emitted only when the resistor is actuated, this type of thermal ink-jet printing is known as “drop-on-demand” printing. Other types of ink-jet related printing includes continuous-stream, acoustic, and ballistic methods.

In a single-color ink jet printing apparatus, the print head typically comprises a linear array of ejectors, and the print head is moved relative to the surface of the print sheet, either by moving the print sheet relative to a stationary print head, or vice-versa, or both. In some types of apparatus, a relatively small print head moves across a print sheet numerous times in swathes, much like a typewriter. Alternatively, a print head which consists of an array of ejectors and extends the full width of the print sheet may be passed once down the print sheet to give full-page images, in what is known as a “full-width array” (FWA) printer. When the print head and the print sheet are moved relative to each other, image-wise digital data is used to selectively activate the thermal energy generators in the print head over time so that the desired image will be created on the print sheet.

In view of the demand for higher resolution printers, the nozzles in ink jet printers are continuing to decrease in size.

Nozzle openings are typically about 50 to 80 micrometers in width or diameter, for example as found in a 300 spots per inch(spi) printer. With the advent of 600 spi printers, these nozzle openings are typically about 10 to about 40 micrometers in width or diameter. These small dimensions require inks which do not plug the openings.

In imaging processes the ink may be applied to a suitable substrate in an image-wise fashion. Application of the ink to the substrate can be by any suitable process compatible with aqueous-based inks, such as flexographic printing, pen plotters, continuous stream ink jet printing, drop-on-demand ink jet printing including both piezoelectric and thermal ink jet processes, and the like printing devices. The substrate employed can be any substrate compatible with aqueous-based inks, including plain paper, such as Xerox® series 10 paper, Xerox® 4024 paper, and the like, coated papers, such as those available from Jujo, transparency materials suitable for aqueous inks or ink jet printing processes, and the like receivers.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

Inks are prepared and evaluated in accordance with the foregoing disclosure and the following illustrative Examples.

EXAMPLE I

Imaging with a Helios Ink Jet—Obscurant White Ink

One or more colored inks are jetted onto a single pixel of Xerox Corporation image series 7NT paper with a Hewlett-Packard Model HP-870cxi printer (600 dpi), and thereafter a heliosing ink jet adapted to deliver an obscurant white ink formulation is jetted onto the first formed colored pixel, such as a magenta ink dot, to produce a heliosed magenta pixel. The white ink contains a dispersion of a white pigment, such as titanium oxide, and, for example, which is over printed on the magenta ink dot. The resulting heliosed pixel scatters incident white light back from the pixel location to an observer and gives an apparent "lightened" or lighter magenta level at that pixel location.

EXAMPLE II

Imaging with a Helios Ink Jet—Bleachant Ink

Example I is repeated with the exception that the heliosing ink jet is adapted to deliver a bleachant ink formulation. A heliosing ink which contains a bleachant when jetted onto a magenta color pixel oxidizes the standard magenta dye color when partially printed over a standard magenta dye color dot thereby reducing the standard dye absorption and produces an apparent "lighten" magenta level from the over-printed pixel location.

EXAMPLE III

Imaging with a Helios Ink Jet—Penetrant Ink

Example I is repeated with the exception that the heliosing ink jet is adapted to deliver a penetrant ink formulation. A heliosing ink which contains an aqueous solution or dispersion of a glossy and penetrating polymer or polymer compounds or penetrant liquid when printed over a magenta pixel dot produces an apparent enhanced white-light backscatter from the over-printed or heliosed pixel location.

EXAMPLE IV

Imaging with a Helios Ink Jet—Penetrant Ink

Example III is repeated with the exception that the heliosing ink jet is adapted to deliver a penetrant ink formulation that contains a surfactant, an alcohol such as ethylene glycol, alone or in combination with other penetrant compounds, which formulation when printed by jetting under or over a magenta color dot pixel, the light absorption of the dye at the surface is reduced and thereby allows the surface fibers of the substrate to scatter more white light back to an observer from the pixel location, giving an apparent heliosed magenta level from that pixel location. Alternatively, if standard dye inks were formulated with very high surface tension, low spreading inks, a penetrating heliosing ink formulation could make the low spreading inks spread "normally" and thereby increase the optical density of that imaged pixel location.

EXAMPLE V

Imaging with a Helios Ink Jet—Penetrant Ink Degrades Dye Dispersion of Printed Ink Example III is repeated with the exception that the heliosing ink jet is adapted to deliver a penetrant ink formulation that contains a dye dispersion destabilizer, for example, compounds which can cause dispersed dye particles on the substrate surface to be swept from the surface and into underlying surfaces or fibers which effect a reduction in the dye/fiber coverage which scatters white light back from that pixel location thereby providing a heliosed magenta level at that pixel.

EXAMPLE VI

Imaging with a Helios Ink Jet—Penetrant Ink Modifies Paper Fiber Coverage of Dye Inks Example III is repeated with the exception that the heliosing ink jet is adapted to deliver a penetrant ink that contains a dye agglomerating compound which ink formulation effects a reduction of the dye/fiber coverage by agglomerating dye particles and scatters white light back from that pixel location thereby providing a heliosed magenta level at that pixel.

Other modifications of the present invention may occur to one of ordinary skill in the art based upon a review of the present application and these modifications, including equivalents thereof, are intended to be included within the scope of the present invention.

What is claimed is:

1. A process comprising:

jetting at least one ink from a color ink set onto a substrate to form a first pixel; and jetting a penetrant ink onto the first pixel to form a heliosed pixel, wherein the first pixel is substantially free of resolution diminution in the heliosed pixel and wherein the penetrant ink when jetted onto the first pixel covers from about 10 to about 50 percent of the area of the first pixel; and wherein the first pixel is accomplished by jetting from about 5 picoliters to about 200 picoliters of one or more colored inks, and wherein the heliosed pixel is accomplished by jetting from about 2 to about 100 picoliters of a penetrant ink onto the first pixel.

2. A process in accordance with claim 1, wherein the color ink set comprises from 1 to about 5 different colored inks.

3. A process in accordance with claim 1, wherein the process produces gray scale images that are substantially free of pixel bleeding, pixel spreading, pixel dot growth, pixel area expansion, and combinations thereof.

4. A process in accordance with claim 1, wherein the process produces gray scale images at a resolution of from about 200×200 spots per inch(spi) to about 1,200×1,200 spi.

5. A process in accordance with claim 1, wherein the penetrant ink physically mixes with the ink or inks of the first pixel.

6. A process in accordance with claim 1, wherein the light absorption of the heliosed pixel is diminished by from about 20 to about 80 percent by the combination of the penetrant ink and the first pixel compared to the light absorption of the first pixel alone.

7. A process in accordance with claim 6, wherein the diminished light absorption of the heliosed pixel provides from about 1 to about 5 additional gray scale levels to the color of the first pixel.

8. A process in accordance with claim 1, wherein the penetrant ink is selected from the group consisting of colorant penetrants, dye dispersion reducing materials, colorant agglomerating agents, and mixtures thereof.

9. A process in accordance with claim 1, wherein the color ink set comprises inks selected from the group consisting of cyan, magenta, yellow, black, and a liquid carrier, and mixtures thereof; and wherein the penetrant ink comprises at least one surfactant material, and a liquid carrier.

10. A process in accordance with claim 1, wherein from 1 to about 5 droplets of the obscurant ink are jetted in forming the heliosed pixel.

11. A process in accordance with claim 1, wherein the first pixel is accomplished by jetting three colored inks comprised of process black, and wherein the heliosed pixel is accomplished by jetting a penetrant ink comprised of surfactant and a low molecular weight diol at least within the area defined by the first pixel.

12. A process in accordance with claim 1, wherein the penetrant ink which contacts the color ink of the first pixel produces incomplete penetration of the color ink through the light reflecting upper surface region of the substrate.

13. A process in accordance with claim 1, wherein the penetrant ink which contacts the color ink of the first pixel produces complete penetration of the color ink through the light reflecting upper surface region of the substrate.

14. A process in accordance with claim 1, further comprising jetting a plurality of individual first pixels and then jetting at least one penetrant ink drop onto at least one of the first pixels to form at least one heliosed pixel wherein the presence of at least one heliosed pixel provides a heliographic image.

15. A process in accordance with claim 1, wherein the jettings are accomplished with an ink jet apparatus capable of jetting at least two to about five discrete ink formulations simultaneously.

16. A process comprising:

jetting a penetrant ink onto a substrate to form a penetrant first pixel; and jetting at least one ink from a color ink set over the penetrant first pixel to form a heliosed pixel, wherein the resolution in the heliosed pixel is substantially the same as the resolution in the absence of the penetrant ink and wherein the penetrant ink when jetted onto the first pixel covers from about 10 to about 50 percent of the area of the first pixel; and wherein the first pixel is accomplished by jetting from about 5 picoliters to about 200 picoliters of one or more colored inks, and wherein the heliosed pixel is accomplished by jetting from about 2 to about 100 picoliters of a penetrant ink onto the first pixel.

17. An ink jet recording apparatus comprising an ink jet deposition system which jets inks in accordance with claim 1.

18. An ink jet recording apparatus comprising an ink jet deposition system which jets inks in accordance with claim 18.

* * * * *